United States Patent [19]

Schmitt et al.

[11] 3,786,381

[45] Jan. 15, 1974

[54] MULTIPOLAR FAULT CURRENT PROTECTIVE SWITCH

[75] Inventors: Volker Schmitt, Eppelheim; Walter Velten, Schwetzingen, both of Germany

[73] Assignee: Brown, Boveri & Cie AG, Mannheim, Germany

[22] Filed: Feb. 7, 1972

[21] Appl. No.: 223,921

[30] Foreign Application Priority Data
Feb. 13, 1971 Germany .................. G 71 05 414.3

[52] U.S. Cl. .............................. 335/13, 317/18 D
[51] Int. Cl. ........................................ H01h 71/46
[58] Field of Search ................. 335/13, 173, 17; 317/58, 18 D

[56] References Cited
UNITED STATES PATENTS
3,636,482  1/1972  Edmunds .......................... 317/18 D
3,436,695  4/1969  Dessert ................................. 335/13
3,566,189  2/1971  Wilson ............................. 317/18 D Primary Examiner—Harold Broome
Attorney—John J. McGlew et al.

[57] ABSTRACT

The switch comprises a summation current transformer unit containing a ground fault current testing part and a release part. Relatively narrow type automatic cutouts or circuit breakers are attached to the unit in juxtaposition thereto, and coupled mechanically and electrically to these parts. Each automatic cutout has, between the input and the output sides, two superposed externally accessible connecting points for interconnection with respective windings of the summation transformer. Each cutout has side walls with openings communicating with the connecting points and providing for insertion of the ends of the respective transformer winding into the cutout and into the connecting points thereof. The unit and the circuit breakers have identical profiles in side elevation and, when bolted together, are mounted in the same switch cabinet.

7 Claims, 3 Drawing Figures

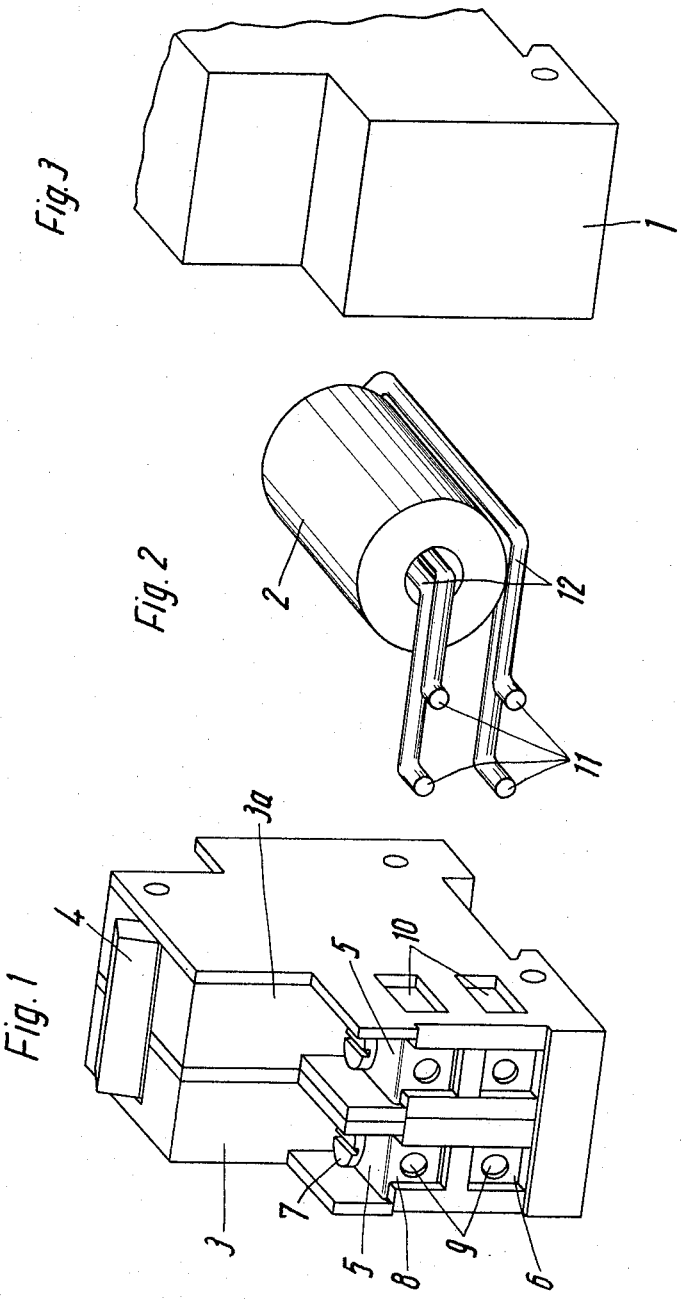

MULTIPOLAR FAULT CURRENT PROTECTIVE SWITCH

FIELD OF THE INVENTION

This invention relates to ground fault current protective switches and, more particularly, to a multipolar fault current protective switch formed of a summation current transformer, a unit containing fault current testing and circuit breaker release parts, and narrow type unipolar automatic cutouts or circuit breakers attached to the unit and coupled mechanically and electrically with the parts.

BACKGROUND OF THE INVENTION

A fault current protective switch of this type is disclosed in German Design Pat. No. 6,607,215, wherein the terminals for the interposition of the winding of the summation current transformer are arranged in series. The terminal for the external connection is arranged on a part attached to the automatic cutouts and forms cable channels for the shunt lines, while it covers the terminal arranged on the automatic cutout. A disadvantage of this arrangement is the widening of the base of the profile of the fault current protective switch, so that this profile no longer coincides with the profile of an automatic cutout. This disadvantage still remains even if the connections to the summation current transformer are made using space-saving tape. However, in this case, there is an additional disadvantage in that the production of such tape is extremely expensive.

SUMMARY OF THE INVENTION

It is the objective of the invention to provide a multipolar ground fault current protective switch of the above-mentioned type with the profile of an automatic cutout or circuit breaker, and with the use of unipolar automatic cutouts or circuit breakers and with a minimum expenditure for the shunt or cross connection.

In accordance with the invention, this problem is solved in that each automatic cutout has, between the input and output sides, two superposed externally accessible connections or connection points, for interconnection of a respective winding of the summation current transformer. Additionally, openings for the passage of the ends of the respective winding of the summation current transformer are provided in the side walls of the automatic cutout and in communication with the connection points.

The upper connecting point can be a terminal with a connecting lug having a bore and bearing on the wall, and the lower connecting point can be the end of a connecting rail or bus designed as a connecting lug with a bore and extending into the switch, and which is likewise pressed to the apparatus wall. The ends of the summation current transformer winding can be conducted, in a simple manner, through the openings, placed from the inside through the bore of the respective connecting lug, and be welded or soldered with the latter from the outside. Preferably, the lower connecting points are covered with an insulating strip so that only the upper connecting point for the external connection remains exposed, so that confusion is not possible.

The summation current unit and the automatic circuit breakers have identical profiles in side elevation, whereby they may be secured together in side-by-side relation to provide a switch having the profile of an automatic circuit breaker. The circuit breakers and the summation current unit, when thus bolted together, are mounted in the same switch cabinet.

An object of the invention is to provide an improved multipolar fault current protective switch.

Another object of the invention is to provide such a switch including a summation current transformer unit containing a fault current testing part and a release part, with unipolar narrow-type automatic cutouts attached to the unit and mechanically and electrically coupled with the parts, and with the unit and the automatic cutouts having identical profiles in side elevation for securing together in side-by-side relation to each other.

A further object of the invention is to provide such a switch in which each automatic cutout has, between its input and output sides, two superposed externally accessible points for the interconnection with a respective winding of the summation current transformer.

Another object of the invention is to provide such a switch in which the side walls of each cutout are formed with openings for passage of the ends of the respective summation current transformer winding, these openings communicating with the connecting points.

For an understanding of the principles of the invenion, reference is made to the following description of a typical embodiment thereof as illustrated in the accompanying drawing.

BRIEF DESCRIPTION OF THE DRAWING

In the Drawing:

FIG. 1 is a perspective view of two unipolar automatic cutouts or circuit breakers combined to form a multipolar automatic cutout;

FIG. 2 is a perspective view of a summation current transformer illustrating the through windings; and FIG. 3 is a perspective view of the unit having the current fault testing part and the release part.

DESCRIPTION OF THE PREFERRED EMBODIMENT

Referring to the drawing, a bipolar fault current protective switch, constituted by the parts illustrated in FIGS. 1, 2 and 3, comprises the unit 1 which contains a fault current testing part and a release part, which have not been shown, and is designed to receive the summation current transformer 2. Unit 1 is arranged to have connected therewith two unipolar automatic cutouts or circuit breakers 3 and 3a which are coupled mechanically with each other and which have a common switch handle 4. Each automatic cutout has superposed connecting points 5 and 6. The upper connecting point 5 is provided for the external connection and has a clamping screw 7 for the external conductor and a connecting lug 8 with a bore 9 for the internal conductor.

The lower connecting point 6 is the end of a conductor rail or bus originating from the inner circuit, and which is designed as a connecting lug. Connecting lug 6 also is provided with a bore 9. Both connecting lugs 6 and 8 are seated on the apparatus wall of the respective automatic cutout 3,3a, in such a manner that the profile is maintained with respect to the base of the automatic cutout.

In the range of the connecting points in cutouts 3 and 3a, there are formed openings 10 in the side walls of each cutout, for the shunt or cross connections to the unit 1. The ends 11 of through windings 12 of summation current transformer 2 are led through or inserted through these housing openings and inserted, from the inside, through the bores 9 of connecting lugs 6 and 8. The respective winding ends are soldered or welded to the connecting lugs from the exterior in a simple manner. The openings 10 in the side walls are marked by grooves which are so designed that the openings can be broken open, when required. In order to obtain protection against contact, the connecting lugs 5 and 6 can be protected by a cover strip of insulating material, which has not been shown.

When the ends 11 of through windings 12 of summation current transformer 2 have been secured in the connecting lugs 6 and 8, and casing 1, whose profile in side elevation is identical with the side elevation profile of the circuit breakers 3 and 3a, is bolted to the circuit breakers, summation transformer 2 is received within and enclosed by the casing or unit 1.

While a specific embodiment of the invention has been shown and described in detail to illustrate the application of the principles of the invention, it will be understood that the invention may be embodied otherwise without departing from such principles.

We claim:

1. A multipolar fault current protective switch comprising, in combination, a summation current transformer; a unit including a modular housing containing a fault current testing part and a release part and arranged to receive said summation current transformer; and relatively narrow-type automatic cutouts each including a respective modular housing and arranged for coupling mechanically and electrically with said unit in modular juxtaposed relation therewith and with each other; each automatic cutout having two superposed connecting points, accessible externally of the front wall of the respective housing, for interconnection with a respective winding of said summation transformer; each cutout having side walls with openings communicating interiorly of the respective housing with said connecting points, said openings providing for insertion of the ends of the respective transformer into the respective housing and into the connecting points thereof for electrical connection thereto from the exterior of the front wall of the respective housing, to electrically interconnect the respective two superposed connecting points.

2. A multipolar fault current protective switch, as claimed in claim 1, in which each connecting point comprises a respective terminal having a bore for receiving a conductor.

3. A multipolar fault current protective switch, as claimed in claim 2, in which each lower connecting point is the end of an electrically conductive rail forming part of the internal circuit of the respective cutout.

4. A multipolar fault current protective switch, as claimed in claim 2, in which each of said terminals is seated in a recess in the wall structure of the associated cutout so as to be completely within the external profile of the associated cutout.

5. A multipolar fault current protective switch, as claimed in claim 4, in which said openings are formed in side walls of the respective cutouts and are in the form of knock-out openings delineated on the external surface of the associated side wall.

6. A multipolar fault current protective switch, as claimed in claim 2, including protective cover strips extending over said terminals.

7. A multipolar fault current protective switch, as claimed in claim 2, in which each upper connecting point is a screw terminal threaded into a connecting lug having said bore, for engagement with an external circuit conductor inserted into the associated connecting lug.

* * * * *